United States Patent [19]

Gyi et al.

[11] Patent Number: 4,520,555
[45] Date of Patent: Jun. 4, 1985

[54] APPARATUS AND METHOD FOR ALIGNING AND ASSEMBLY OF A GIMBAL, MAGNETIC SLIDER HEAD, AND FLEXURE ARM

[75] Inventors: Ko Ko Gyi, Thousand Oaks; Gurbachan S. Grewal, Sepulveda, both of Calif.

[73] Assignee: Magnetic Information Technology, Inc., Chatsworth, Calif.

[21] Appl. No.: 424,073

[22] Filed: Sep. 27, 1982

[51] Int. Cl.³ .............................................. G11B 5/42
[52] U.S. Cl. ....................................... 29/603; 29/467; 29/468; 29/760
[58] Field of Search ................. 29/603, 737, 760, 467, 29/468

[56] References Cited

U.S. PATENT DOCUMENTS 3,611,557 10/1971 Hardardt et al. ...................... 29/603
3,916,511 11/1975 Brehe .................................... 29/603

Primary Examiner—Carl E. Hall
Attorney, Agent, or Firm—Evanns & Walsh

[57] ABSTRACT

A fixture or fixtures and method for assembly and/or fabrication of a component of magnetic information storage apparatus. The component is a flexure arm carrying parts including a gimbal plate; transducer, that is, a magnetic slider head; and a flex cable connecting to the magnetic poles of the magnetic slider head. A fixture is provided having a configuration and holding pins for holding the magnetic slider head; for holding the gimbal plate, and a flexure arm with parts in aligned relationship, the fixture having a removable part which holds the gimbal plate and which is removable from the fixture for subsequent positioning of the flexure arm. Fixture parts are provided for configurating the flex cable. The method comprises a series of steps including positioning parts to be assembled in relationship to the fixture; taking out the removable fixture part; positioning the flexure arm and bonding and attaching the parts together to complete the fully assembled and fabricated component.

17 Claims, 15 Drawing Figures

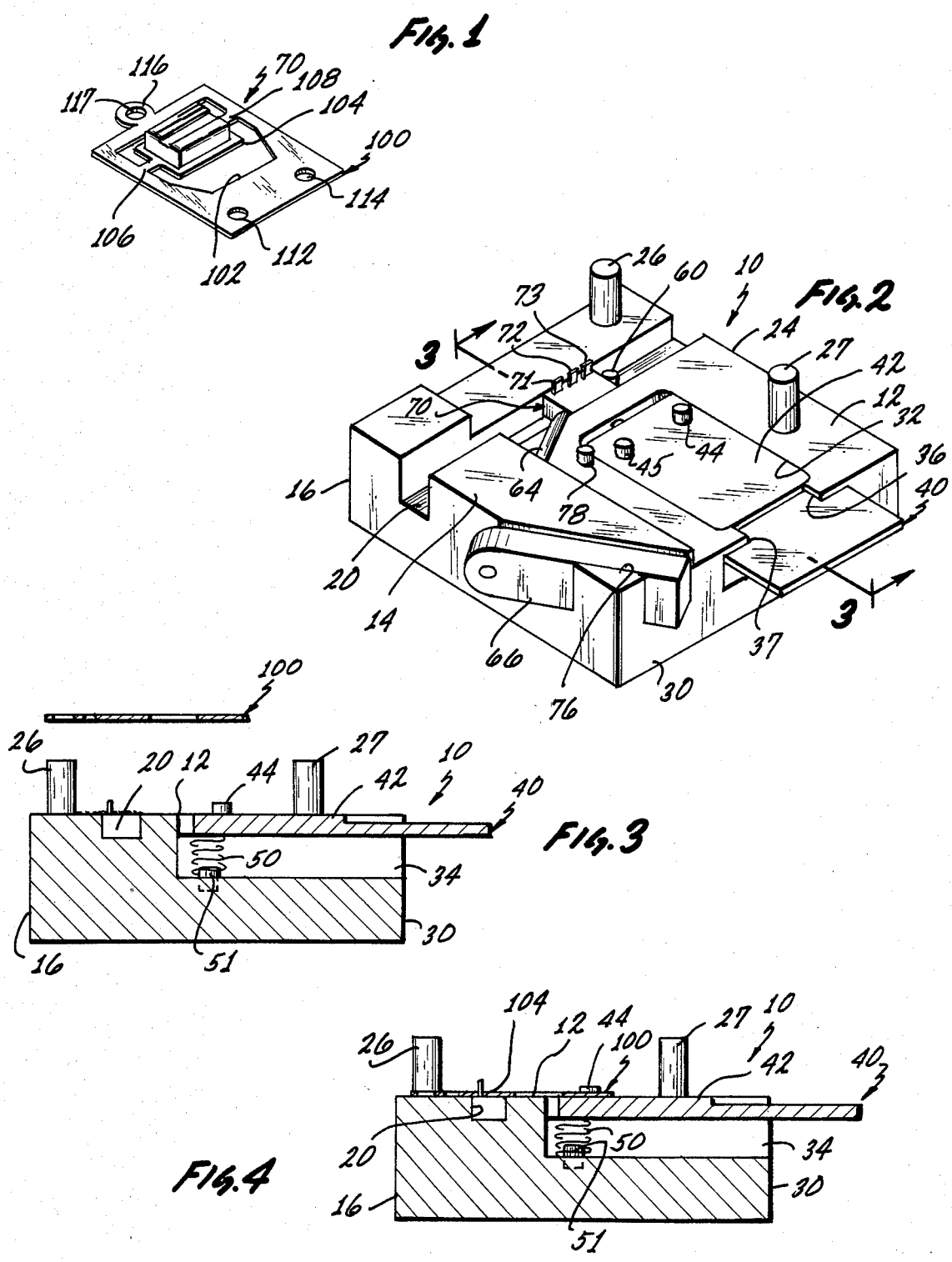

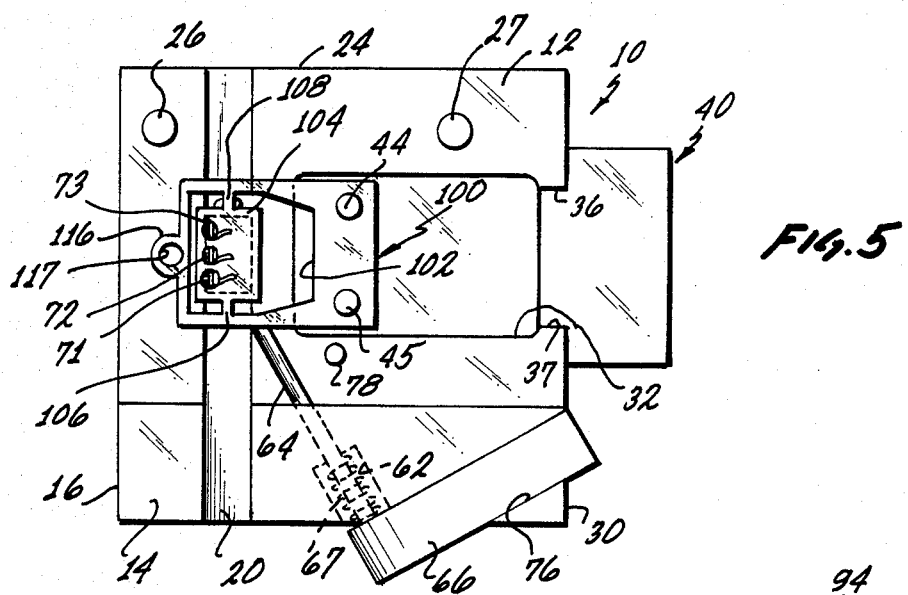
*Fig.5*
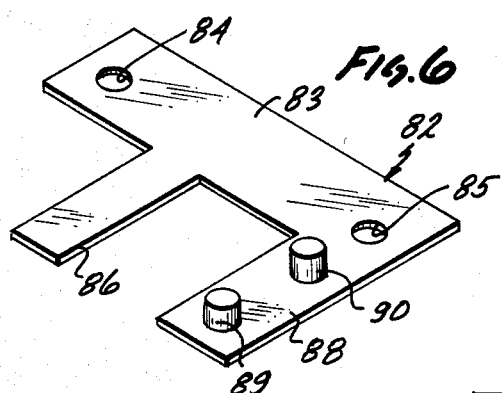
*Fig.6*
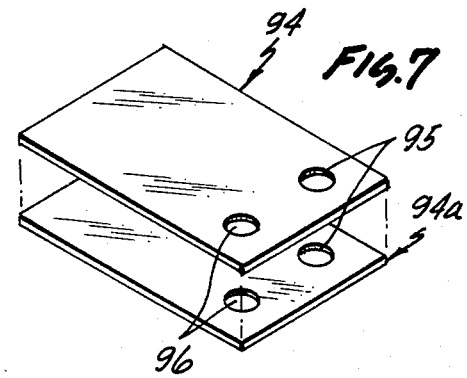
*Fig.7*
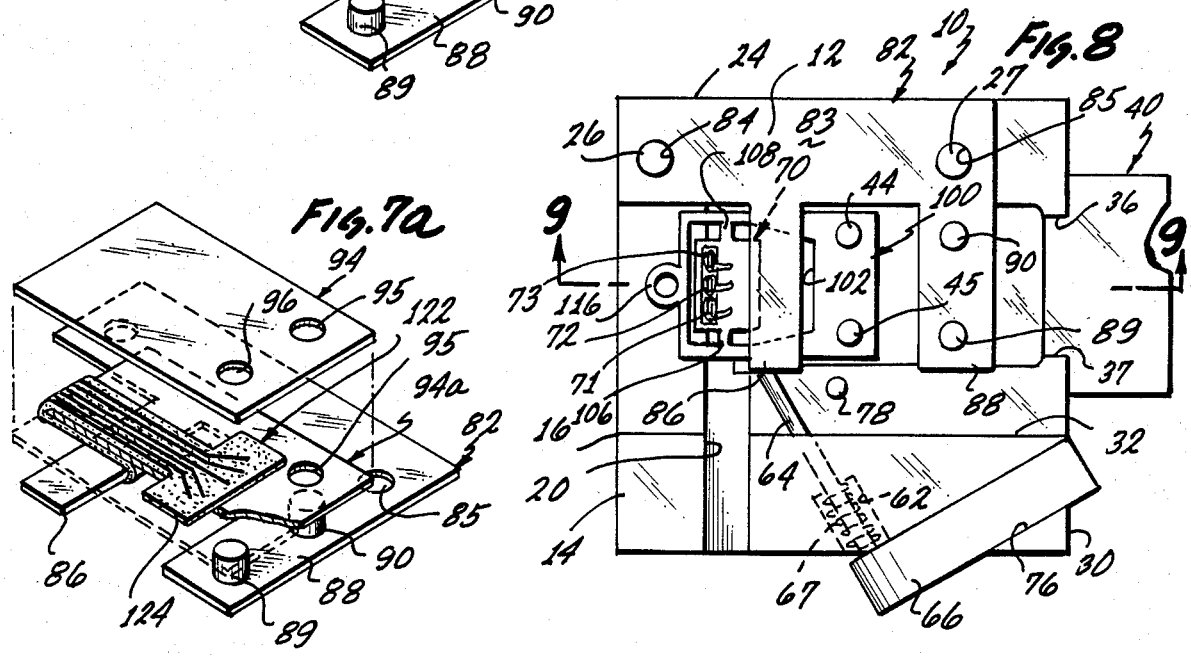
*Fig.7a*
*Fig.8*

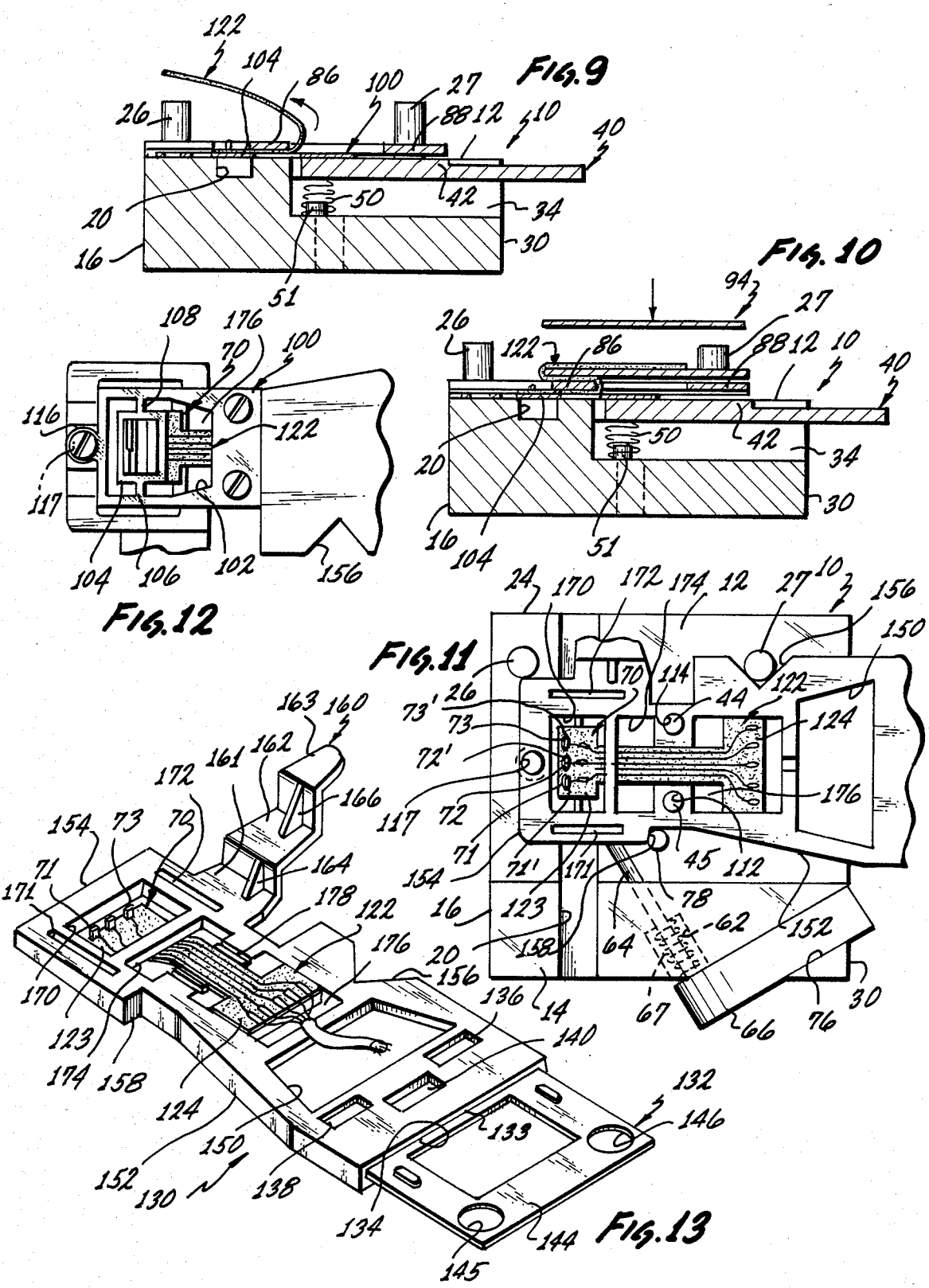

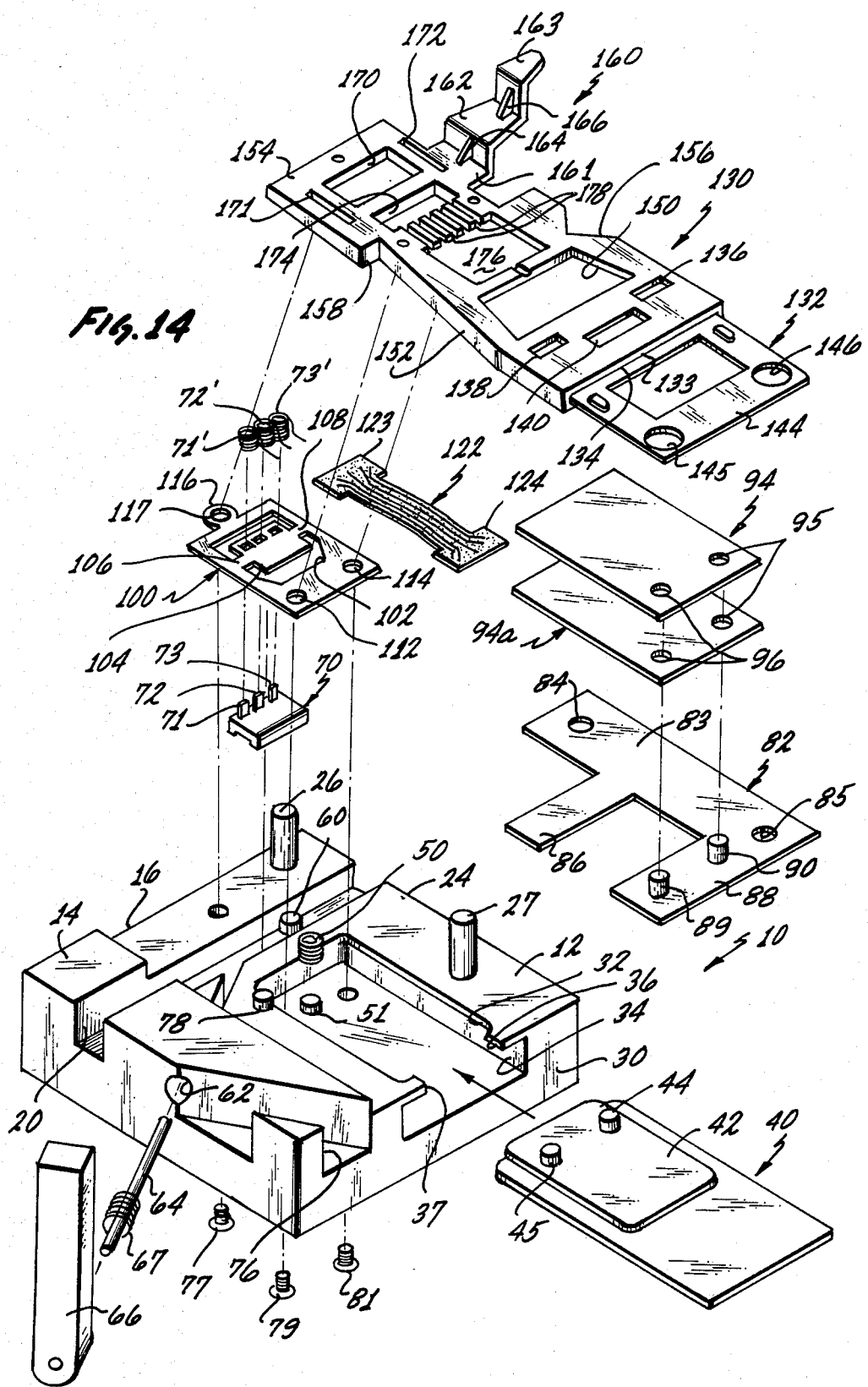

APPARATUS AND METHOD FOR ALIGNING AND ASSEMBLY OF A GIMBAL, MAGNETIC SLIDER HEAD, AND FLEXURE ARM

BACKGROUND OF THE INVENTION

1. Field of the Invention

The field of the invention, broadly, is that of magnetic information storage equipment, particularly of types adapted for use in micro and mini computers. The field of the invention is more particularly concerned with the assembly and/or fabrication of components of recording and pickup mechanism for flexible disc records.

2. Description of the Prior Art

U.S. Pat. Nos. 4,139,876 and 4,170,146 are exemplary of units or assemblies embodying drive mechanism for a flexible disc on which information is magnetically recorded with an associated magnetic head. In the contemporary state of the art, it is now common-place to use two magnetic heads, one on each side of the disc record.

In the contemporary state of the art components or subcomponents of an information storage unit may be separately fabricated or produced and then marketed to a vendee who assembles the subcomponent or component into its own product.

Certain components, such as for example, the arm which carries the magnetic head, that is the magnetic slider head and the gimbal or gimbal plate must be assembled with the parts in precision alignment and fabricated, that is the parts must be then joined or bonded together while maintaining the precision alignment and positioning. Typically, the parts are very small and difficult to handle or manipulate by hand, particularly, where the precision alignments and positioning are required and where the taking of measurements might be necessary.

There exists an unfilled need in the art for tooling and methods or techniques to faciliate the alignment, assembly, and fabrication of a component of the type referred to. The prior art is lacking in tooling and methods as stated, particularly, fixtures or fixturing whereby the alignment and positioning as well as actual joining or fabrication of the parts can be facilitated and expedited by way of eliminating wholly manual handling, positioning, aligning, and joint of parts.

The herein invention seeks to overcome the deficiencies of the prior art and to fill the unfilled needs, an exemplary form of the invention being described in detail hereinafter.

SUMMARY OF THE INVENTION

In the exemplary form of the invention a fixture or fixtures are provided and methodology particularly adapted for alignment, assembly, and fabrication of a flexure arm which carries a magnetic slider head; a gimbal plate; and a flex cable having its conductors connected at one end to the magnetic slider head.

Tooling including an unique form of fixture is provided in which a magnetic slider head is held, the fixture having means to hold a gimbal plate in aligned position relative to the magnetic slider head in which position the magnetic slider head and gimbal plate can be bonded together, the fixture additionally having a structure whereby the flexure arm can be held in an aligned position over the gimbal plate and magnetic slider head for securement of the gimbal plate to the arm. The fixture is of particular construction adapting it for holding the magnetic slider head and additionally having a movable or detachable part whereby engagement with the gimbal plate can be released adapting the fixture to receive the flexure arm in aligned position for securement to the gimbal plate.

In addition to the alignment of the parts identified in the foregoing, additional fixtures or fixture members are provided for the purpose of forming a desired configuration in a flex cable which becomes a part of the finished component, the ends of the conductors of the flex cable being connected to the poles of the magnetic slider head and the flex cable being otherwise joined to the flexure arm. The additional fixture members are in the form of overlying plates constructed to be held in aligned position on the primary fixture with the conductors of the flex cable held between plates in a manner to form the desired configuration in the flex cable.

In the utilization of the fixture and fixture members, as identified in the foregoing, the invention provides a method whereby to realize the most advantageous results as respects the precision alignment of the parts and the joining of the parts in the final component. The steps of the method include the positioning and holding of the magnetic slider head in the fixture; the positioning and alignment of the gimbal plate in the fixture; the securement of the gimbal plate to the magnetic slider head; the assembly of the flex cable, its connection to the poles of the magnetic slider head; the configurating of the flex cable; the positioning of the flexure arm in an aligned retained position on the fixture and its securement to the gimbal plate and the magnetic slider head. A feature of the fixture is the provision of a removable part which holds the gimbal plate and which is moved or removed after the gimbal plate has been secured to the magnetic slider head to allow positioning of the flexure arm, assembly of the flex cable and securement of the flexure arm to the gimbal plate and magnetic slider head.

In the light of the foregoing the primary object of the invention is to provide tooling by way of a fixture and fixture members and methodology for purposes of facilitating the alignment and assembly of parts of a component esspecially a flexure arm carrying a magnetic slider head, gimbal plate, and flex cable.

A further object is to provide a fixture adapted for the purpose identified in the previous object in the form of a block or base member having a construction for holding a magnetic slider head; having means to hold a gimbal plate in alignment with the magnetic slider head; and having means to hold a flexure arm in aligned position relative to the gimbal plate and magnetic slider head and for securement thereto.

A further object is to provide a further feature in the fixture as identified in the foregoing by way of the fixture having a part which holds the gimbal plate and which is movable or removable after securement of the gimbal plate to the magnetic slider head to accommodate positioning and retainment of the flexure arm along the fixture.

A further object is to provide additional fixture members in the form of particularly shaped plates which can be positioned on the fixture for providing a desired configuration in a flex cable.

A further object is to provide particular methodology for aligning and assembly of parts that have been identified utilizing the fixture as described and the fixture members.

A further object is to provide a method which includes the steps of positioning and holding the magnetic slider head; positioning and holding the gimbal plate; joining the gimbal plate to the magnetic slider head; positioning and configurating the the flex cable, and connecting it to the poles of the magnetic slider head; and positioning a flexure arm relative to the other parts and securing it to the gimbal plate and the magnetic slider head.

Further and more detailed objects and advantages of the invention will become apparent from the following detailed description and annexed drawings.

BRIEF DESCRIPTION OF THE DRAWINGS

FIG. 1 is an isometric view of a gimbal plate or element carrying a magnetic slider head;

FIG. 2 is an isometric view of the fixture of the invention in which the assembly of parts is carried out;

FIG. 3 is a cross sectional view taken along the line 3—3 of FIG. 2;

FIG. 4 is a cross sectional view similar to that of FIG. 3 showing the gimbal plate of FIG. 1 in position on the fixture;

FIG. 5 is plan view of the fixture of FIG. 2 with the gimbal plate of FIG. 1 in position on the fixture;

FIGS. 6 and 7 are isometric views of the fixture plates that are utilized for configurating the flex cable;

FIG. 7a is an isometric view illustrating the method steps in using the fixture plates of FIGS. 6 and 7;

FIG. 8 is a plan view of the fixture of FIG. 2 with the fixture plate of FIG. 6 in position;

FIG. 9 is a cross sectional view similar to FIG. 3 with the plate of FIG. 6 in position on the fixture;

FIG. 10 is a cross section view similar to that of FIG. 9 with both the fixture plates of FIGS. 6 and 7 in position;

FIG. 11 is a plan view of the fixture of FIGS. 2, 5 and 8 with the flexure or cantilever arm in position on the fixture and with the flex cable positioned;

FIG. 12 is a bottom view of the flexure arm showing securement of the gimbal plate to it;

FIG. 13 is an isometric view of the flexure arm showing the ends of the flex cable attached to the poles of the magnetic slider head;

FIG. 14 is an exploded view showing the fixture and its parts; and showing the parts to be assembled including the magnetic slider head; the gimbal plate; the flexure arm; the flex cable; and also the fixture plates that are utilized for configurating the flex cable.

DESCRIPTION OF THE PREFERRED EMBODIMENT AND BEST MODE OF PRACTICE

Referring to FIG. 2 of the drawing, this figure shows the fixture which is utilized in the assembly of the parts and the fabrication of the component, which has been described in the foregoing and which will be identified in detail hereinafter. The fixture is identified as whole by the numeral 10. Reference should also be had to the exploded view 14 in connection with the description of the fixture. It is in the form of a rectangular block of material which may be aluminum, for example. It has a top surface 12 which is flat there being a raised surface 14 along one side of the fixture. The fixture may be square by way of example, so as to have four sides of equal length.

One side is identified by the numeral 16. Spaced from this side is a rectilinear slot 20, having a purpose which will be described presently.

Upstanding from the surface 12 adjacent to a side 24 are pins 26 and 27 the purpose of which will be referred to again presently.

Numeral 30 designates another side.

The top 12 has a rectangular opening in it as identified by the numeral 32. This opening overlies a channel or way identified by the numeral 34 formed in the fixture directly below the opening 32, the sides of the opening 32 forming parts which overhang the channel or way 34, the overhanging parts having inwardly extending extensions identified by the numerals 36 and 37. Numeral 40 designates a flat plate of a size such that it can slide into the channel or way 34. Plate 40 carries on its upper surface a smaller plate 42 which can fit into the opening 32 in the top 12 inside of the extensions 36 and 37, as may be seen in FIG. 2. Numerals 44 and 45 designate a pair of pins upstanding from the plate 42 having a purpose which will be described presently.

When the plate 40 with plate 42 is in position in the channel or way 34 and in the opening 32, the plate 40 is biased or urged upwardly by way of a pair of springs, one of which is designated by the numeral 50 carried on a pin 51 upstanding from the bottom of the channel 34. Preferably, a second pin and spring is provided to urge the plate 40 upwardly within the fixture.

The channel 20 has a stop pin 60 in it upstanding from the bottom for a purpose which will be described presently.

The fixture 10 has formed in it an oblique or diagonal bore as designated at 62 in which can be received a stem 64 that is positionable by a manually actuated lever 66, there being a biasing spring 67 on the stem 64. Numeral 70 designates a magnetic slider head which has embedded in it a magnetic core with a magnetic gap. This slider head is of a conventional construction. As shown in FIG. 2 it has poles 71, 72, and 73 extending from it. As shown it is positioned against the stem 60 and it is held by the end of the stem 67 which engages the opposite end of the magnetic slider head.

The fixture block 10 has an angular slot 76 formed in a corner of it as may be seen into which the lever 66 can be moved holding the stem 67 in position. The parts as just described hold the magnetic slider head positioned while the assembly and fabrication steps, which will be described, are performed.

Numeral 78 designates a pin upstanding from the surface 12 adjacent to the opening 32 for a purpose which will be described presently.

Numeral 77, 79, and 81 designate screws the purpose of which will be described presently.

The tooling includes a fixture plate as shown in FIG. 6, as designated by the numeral 82. It has a main part 83, having two holes as designated at 84 and 85 spaced apart an amount so that these holes can fit down over the pins 26 and 27 previously described. Plate 82 has an extension 86 and a second extension 88 spaced apart, this extension having upstanding pins 89 and 90 for a purpose which will be described presently.

Numeral 94 designates another fixture plate having two holes in it designated by the numerals 95 and 96 spaced apart a distance so that they can fit down over the pins 89 and 90 of the fixture plate 82 for a purpose which will be described. Numeral 94a designates a second fixture plate that is just like plate 94. The manner in which the fixture plates 83, 84 and 94a are utilized in the assembly will be explained presently.

The Parts to be Assembled

One of the parts to be assembled is the magnetic slider head 70 already described. Another of the parts is the gimbal plate 100 as may be seen in FIGS. 1 and 14. The gimbal plate 100 may be of generally conventional construction. Typically, it is formed of very thin metal material, for example, copper. It has an opening in it as designated by the numeral 102. Positioned in the opening and partially filling it is a gimbal member 104 which is integrally attached to the plate 100, by side connecting or gimbal portions 106 and 108 which form a gimbal axis about which the plate 104 can have angular motion with respect to the plate 100. The gimbal plate 104 has openings in it as shown which are spaced apart to receive the poles, 71, 72, and 73 of the magnetic slider head 70 as previously described. See FIG. 14. When the parts are assembled the poles 71, 72, and 73 have assembled on them the windings 71', 72', and 73' as shown in FIG. 14.

The gimbal plate has in it mounting holes 112 and 114. It has an extending tab 116 with a hole 117 in it for a purpose as will be described presently.

Numeral 122 designates a flex cable which is of conventional construction embodying a plurality of conductors which may be connected to a pad 123 at one end, and a pad 124 at the other end.

Numeral 130 designates the flexure arm which in the magnetic storage equipment is a cantilevered transducer support arm which supports the transducer, that is, the magnetic slider head which contacts the record. The flexure arm can be of generally conventional construction. It may be made of plastic, for example, having a shape as shown in FIGS. 13 and 14. In the apparatus of which it is a part it is mounted by way of a flexible rectangular flexure member 132 which may be made of thin flexible metal. One side of the member 132, as designated at 133, is secured in a slot 134 in the end part of the arm 130, which has openings in it as designated at 136, 138 and 140. The opposite side part of the member 132 is designated at 144. It has mounting openings in it as designated at 145 and 146 by which it can be mounted to the carriage, which is a part of the apparatus that has been referred to in the foregoing.

The arm 130 has a recess 150 in it which reduces the weight and the inertia. The foreward part of the arm is tapered as shown at 152 and it has generally square portion 154 at its end. In the side is formed a notch 156 having a purpose which will be described presently. On one side there is a square shoulder 158 between the tapered part and square end part. On the opposite side of the end part is a stepped extension 160, the steps providing several levels 161, 162, and 163 with square shoulders between them. At the square shoulders are strengthening ribs 164 and 166. The extension or extension arm 160 is for purposes of lifting the flexure arm 130 in response to electrical signals to separate the transducer, that is, the magnetic slider head from the record. The square end part 154 has a rectangular opening 170 in it on opposite sides of which are slots 171, and 172. The purpose of the opening will be described presently. Adjacent to the opening 170 is another smaller opening 174 which is spaced from a pad 176 for attachment of the flex cable with a plurality of slots as shown at 178 for flex cable conductors between opening 174 and the pad 176.

Method of Assembly and Fabrication

FIG. 13 shows the parts 70, 100, 122, and 130 in assembled and fabricated relationship.

The steps in the method of assembly and fabrication will be understood from the following with reference to FIGS. 1 through 14. At the outset the magnetic slider head 70 is positioned in the fixture 10 as shown in FIG. 2 and as described in the foregoing. The plate 40 and its overlying plate 42 are in position as shown in FIG. 2. Bonding material which may be epoxy is placed on the magnetic slider head 70 as may be seen in FIGS. 3 and 4 for purposes of bonding the gimbal plate 100 to it, FIG. 1 being a view of the underside of the gimbal plate 100 with the magnetic slider carried on the gimbal part 104.

Next the flex cable 122 is assembled by being bonded to the gimbal plate 100. The flex cable has a rectangular part or pad 123 at the end as may be seen in FIG. 14 which is bonded to the part 104 of the gimbal plate 100. The rectangular part 123 may have holes in it for the poles 71, 72, and 73 of the magnetic slider head to extend through. The gimbal part 104 is put in position over the magnetic slider head 70 and the coils 71', 72' and 73' are placed on the poles 71, 72, and 73 of the magnetic slider head and the ends of the conductors of the flex cable are soldered to the coils, the other ends of the flex cable being soldered to the pad 124 at the opposite end or connected to the conductors of a lead in cable. FIG. 4 shows the gimbal plate 100 in position on the fixture 10 with the pins 44 and 45 of the plate 42 extending through the holes 112 and 114 in the gimbal plate 100.

As may be seen in the assembly of FIG. 13 the flex cable 122 is configurated so as to be able to pass through opening 174 in the arm 130. In the next stop in the method the necessary configuration is formed in the flex cable 122 as illustrated in FIGS. 9 and 10 utilizing the fixture plates 82, 94, and 94a. The fixture plate 82 is placed in position on the fixture 10 as illustrated in FIG. 8. The fixture plate is in position as shown with the pins 26 and 27 of the fixture 10 extending through the holes 84 and 85 of the plate 82. The extensions 86 and 88 of the plate 82 are in the position as shown in FIG. 8. The flex cable 122 is brought under the extension 86 as may be seen in FIG. 9. The fixture plate 94a is then put in position over the fixture plate 82 with the conductors of the flex cable 122 wrapped over the end of the plate 94a as may be seen in FIG. 10. See FIG. 7a. The holes 95 and 96 in the plate 94a are positioned over pins 89 and 90 in the plate 82. Then plate 94 is positioned over plate 94a with flex conductors in between plates 94 and 94a as illustrated in FIGS. 10 and 7a. This accomplishes the bend configuration in the flex cable while the epoxy previously referred to is curing.

After curing of the bonding material, that is, the epoxy the fixture plates 94 and 82 are removed.

The plates 40 and 42 are now removed from the fixture. This is done by pushing the plates downwardly against the springs like the spring 50 so that the pins 44 and 45 are disengaged from the holes 112 and 114 in the gimbal plate 100. The arm 130 is now positioned on the fixture in a position as shown in FIG. 11. The end part 154 is against the pin 26. The pin 27 is in the notch 156. The pin 78 is against the square shoulder 158. In this position the flex cable 122 is extended through opening 174 in arm 130.

The gimbal plate 100 is now secured to the arm 130 by way of screws 77, 79, and 81, as previously referred to which are extended through holes not shown in the bottom of the fixture, then through the holes 112, 114, and 116 in the gimbal plate 100 and into the arm 130. The attachment is shown in FIG. 12.

The load pin 64 can now be released by the lever arm 66 so that arm 130 with the gimbal plate attached and the magnetic slider head can be removed from the fixture. All parts are now assembled and fabricated in proper alignment. The arm 130 with the gimbal plate 100 and the magnetic slider head 70 can now be attached to or mounted on a carriage of the type as shown in the patents previously referred to.

From the foregoing, those skilled in the art will readily understand the nature of the invention, the utilization of the fixtures and the manner in which the method of the invention is executed. From the disclosure it will also be readily clear as to the manner in which the objects and purposes as set forth in the foregoing are realized.

The parts to be assembled are relatively small and must be assembled or fabricated in correct alignment and relationship. It will be observed that the fixturing apparatus produces correct alignment of the parts particularly as respects the magnetic slider head 70 and the gimbal plate 100, and also the alignment of these parts with respect to the arm 130. Advantages derive from the fact that these parts are held in their proper relationship by the fixture. With these advantages provided by the fixturing the further steps of the method are greatly facilitated.

The foregoing disclosure is representative of a preferred form of the invention and is to be interpreted in an illustrative rather than a limiting sense the invention to be accorded the full scope of the claims appended hereto.

We claim:

1. As an article of manufacture a fixture for use in assembling parts of a component of magnetic information storage apparatus, the parts including a magnetic slider head; a gimbal plate; and, a flexure arm, in combination, a fixture member having means to removably receive and hold a magnetic slider head; the fixture having means for holding a gimbal plate in position relative to the said magnetic slider head, the said fixture having means to hold a flexure arm in aligned position relative to the gimbal plate and the magnetic slider head, the magnetic slider head, gimbal plate, and flexure arm being in position to be secured together.

2. An article as in claim 1, wherein the means for holding the gimbal plate includes a movable member which is movable whereby to release the gimbal plate and allow positioning of the flexure arm over the gimbal plate.

3. An article as in claim 2, said movable member having pin means adapted to engage in aperture means for holding the gimbal plate, the pin means being releasable from the aperture means by movement of the movable member.

4. An article as in claim 1, wherein the holding means for the flexure arm are in the form of pin means provided on the fixture member.

5. An article as in claim 2, the fixture having a recess in it, the holding member for the gimbal plate fitting in the recess and being movable to release the gimbal plate.

6. An article as in claim 5, wherein the movable member is movable downwardly in the said recess.

7. An article as in claim 5, said movable member having pin means adapted to engage in aperture means for holding the gimbal plate, the pin means being releasable from the aperture means by movement of the movable member.

8. An article as in claim 1, wherein the means to receive and hold the magnetic slider head includes a recess in the fixture having means providing a stop against which the magnetic slider head can be positioned, and a manually positionable member engagable with another part of the magnetic slider head.

9. An article as in claim 8, wherein the said manually positionable member is in the form of a stem movable in a bore in the fixture.

10. An article as in claim 9, including the means in the fixture for holding the gimbal plate including means movable to release the holding engagement with the gimbal plate.

11. A method of assembly of parts for a component of magnetic information storage apparatus including at least a magnetic slider head with a magnetic gap; a gimbal plate; and a carrying arm, comprising in combination, the steps of holding the magnetic slider head in a fixture; holding the gimbal plate in the fixture in aligned position relative to the magnetic slider head; securing the gimbal plate to the magnetic slider head; positioning the carrier arm on the fixture in aligned retained position relative to the gimbal plate and the magnetic slider head; and securing the magnetic slider head and gimbal plate to the carrier arm while in the fixture.

12. A method as in claim 11, including the step of releasing the holding engagement of the fixture to the gimbal plate before positioning the carrier arm.

13. A method as in claim 11, including holding the magnetic slider head in the fixture in a position having its poles exposed and including the step of placing coils on the said poles.

14. A method as in claim 13, including the step of connecting the conductors of a flex cable to the magnetic slider head while in the fixture.

15. A method as in claim 11, including the step of connecting the conductors of a flex cable to the magnetic slider head while in the fixture.

16. A method as in claim 15, including extending the connectors of the flex cable from the magnetic slider head through an opening in the carrying arm.

17. A method as in claim 14, including the step of forming a bend configuration in the conductors of the flex cable to facilitate its assembly with the other parts.

* * * * *